United States Patent [19]

Panaoussis

[11] Patent Number: 4,586,091
[45] Date of Patent: Apr. 29, 1986

[54] SYSTEM AND METHOD FOR HIGH DENSITY DATA RECORDING

[75] Inventor: Spyro Panaoussis, Chicago, Ill.

[73] Assignee: Kalhas Oracle, Inc., Darien, Ill.

[21] Appl. No.: 606,695

[22] Filed: May 3, 1984

[51] Int. Cl.[4] .............................................. G11B 5/09
[52] U.S. Cl. ........................................ 360/40; 360/51
[58] Field of Search ............... 360/40, 46, 51; 317/41, 317/17

[56] References Cited

U.S. PATENT DOCUMENTS

| | | | |
|---|---|---|---|
| 3,020,526 | 2/1962 | Ridler et al. | 360/39 |
| 3,038,148 | 6/1962 | Tait et al. | 360/39 |
| 3,040,306 | 6/1962 | Hand, Jr. et al. | 360/39 |
| 3,108,261 | 10/1963 | Miller | 360/39 |
| 3,108,265 | 10/1963 | Moe | 360/39 |
| 3,217,329 | 11/1965 | Gabor | 360/39 |
| 3,218,618 | 11/1965 | Warren | 360/40 |
| 3,264,623 | 8/1966 | Gabor | 360/39 |
| 3,276,033 | 9/1966 | Cogar et al. | 360/39 |
| 3,277,454 | 10/1966 | Chao | 360/39 |
| 3,331,079 | 7/1967 | Reader | 360/39 |
| 3,373,415 | 3/1968 | Gabor | 360/39 |
| 3,374,475 | 3/1968 | Gabor | 360/39 |
| 3,377,583 | 4/1968 | Sims, Jr. | 360/39 |
| 3,573,766 | 4/1971 | Perkins, Jr. | 360/39 |
| 3,623,039 | 11/1971 | Barham | 360/39 |
| 3,643,228 | 2/1972 | Lipp | 360/39 |
| 3,646,534 | 2/1972 | Miller | 360/39 |
| 3,685,021 | 8/1972 | Mauch et al. | 360/39 |
| 3,736,581 | 5/1973 | Breikss | 360/39 |
| 3,831,191 | 8/1974 | Gold | 360/39 |
| 3,905,029 | 9/1975 | McIntosh | 360/39 |
| 4,067,050 | 1/1978 | Munninghoff | 360/40 |
| 4,195,318 | 3/1980 | Price et al. | 360/39 |
| 4,202,016 | 5/1980 | Sampey | 360/39 |
| 4,342,654 | 7/1982 | Terui et al. | 360/40 |
| 4,351,008 | 9/1982 | Mochizuki et al. | 360/40 |
| 4,356,518 | 10/1982 | Lemoine et al. | 360/39 |
| 4,377,805 | 3/1983 | Youhill | 360/39 |

Primary Examiner—Vincent P. Canney
Attorney, Agent, or Firm—Lockwood, Alex, Fitzgibbon & Cummings

[57] ABSTRACT

A method and system for high density data recording is provided. Parallel encoded digital data are converted to corresponding serial format data words. Individual cycles of a periodic signal are selectively attenuated in accordance with the logic state of individual bits of the serial data words. By determining the relative level of the periodic signal during periods defined by individual cycles of the signal, the sequence of logic data bits forming the serial data words can be reconstructed.

19 Claims, 8 Drawing Figures

SYSTEM AND METHOD FOR HIGH DENSITY DATA RECORDING

The present invention relates generally to method and apparatus for recording digitally encoded data on a magnetic recording medium and more specifically to a method and apparatus for providing high density digital data recording using analog recording devices.

In the computer field, a need has always existed for economical, high volume data storage methods and equipment. With the recent rapid expansion in personal computer ownership and use, this need has become even greater.

Magnetic recording media, such as open reel tapes, cassettes, or flexible discs, have long been preferred for data storage since they continue to offer an attractive compromise among the competing considerations of cost, storage capacity and speed of data retrieval. In the case of personal computers, data storage, using analog magnetic recording equipment such as conventional hi-fidelity audio recording devices, is particularly attractive since such equipment is generally economically priced, readily obtainable and frequently already available to the computer user without further expenditure.

It has been recognized that by increasing the density of recorded data on a magnetic recording medium, costs can be reduced while simultaneously improving both the storage capacity and data retrieval speed of a data recording system. Conventional analog recording devices, however, are not typically designed to maximize data recording density and hence when utilized, are limited in their ability to rapidly and accurately record such information on minimal area of the available recording medium. This limits the storage capacity of a given quantity of recording medium, and, particularly in the case of cassettes or open reel tapes, reduces data retrieval speed since individual recorded data are located at more physically disparate locations on the recording medium. Accordingly, systems have from time to time been proposed for increasing the data recording density attainable using audio magnetic recording equipment.

One such system contemplates processing digital signals as to avoid saturating the magnetic medium when the signals are recorded on an audio recording device. In another system, recording density is increased by appropriately encoding the data but no provision is made for avoiding saturation of the magnetic recording medium during data recording. In still another system, state transitions of a periodic logic signal are time shifted in accordance with the data to be recorded.

The present invention is directed to a method and apparatus for increasing data recording density attainable with use of analog recording devices. The method includes encoding the data as to minimize required flux transitions while suitable conditioning of the recording signals avoids saturation of the magnetic recording medium. The method and apparatus permit individual data bits to be recorded at a rate limited by the upper frequency response of the analog recording device. The method has the further advantage that a clock signal is recorded simultaneously with data thereby minimizing difficulties associated with synchronization during recovery of recorded data.

To achieve high density data recording using conventional analog recording devices, a system for processing digitally encoded data for storage on a magnetic recording medium is provided. The system includes circuitry for generating periodic clock and data signals of substantially constant frequency. A data converter converts the digitally encoded data to be recorded to a corresponding series of sequentially occurring bi-stable logic data bits. A signal attenuator responds to the logic state of each of the bits and attenuates the data signal in accordance with the logic states of each of the bits. Accordingly, the relative level of the data signal indicates the logic state of each of the logic data bits.

In view of the foregoing, it is a general object of the present invention to provide a method and apparatus for high density recording of digitally encoded data on a magnetic recording medium.

It is a further object of the present invention to provide a high density data recording method and apparatus compatable with use of audio recording devices.

The features of the present invention which are believed to be novel are set forth with particularity in the appended claims. The invention, together with the further objects and advantages thereof, may best be understood by reference to the following description taken in conjunction with the accompanying drawings, in the several figures in which like reference numerals identify like elements, and in which:

Figure 1:
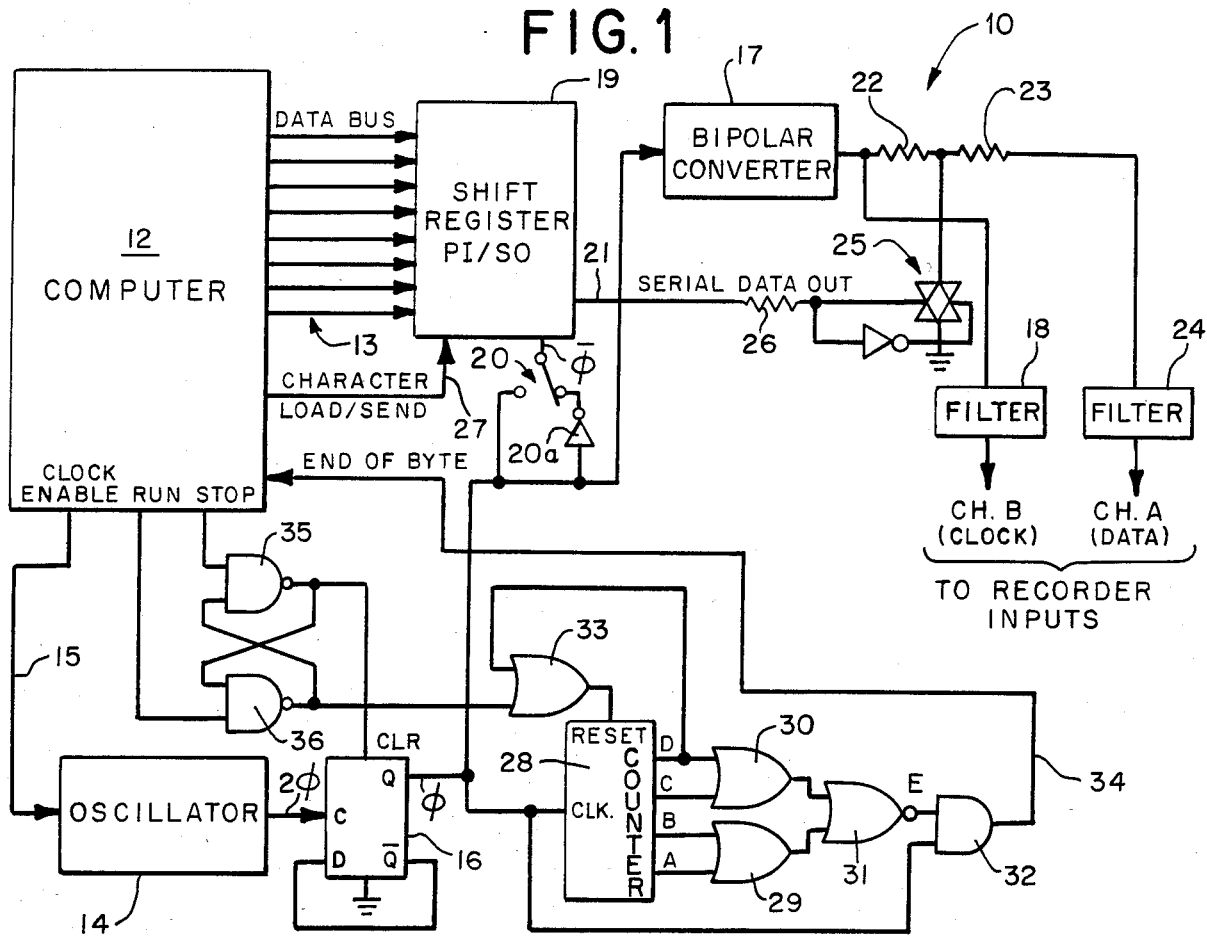
FIG. 1 is an electrical schematic diagram of a system, constructed in accordance with the present invention, for high density recording of digitally encoded data on a magnetic recording medium.
Figure 2:
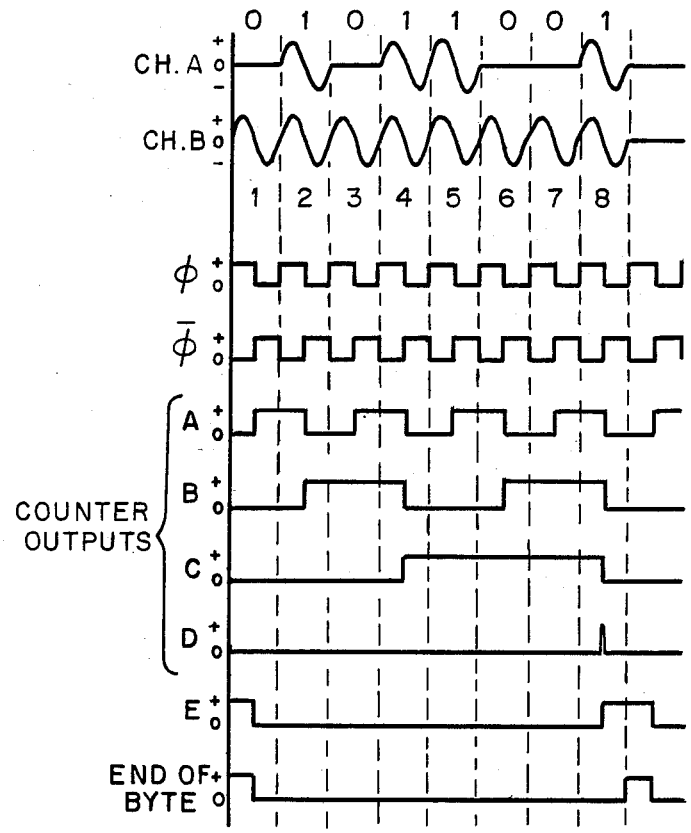
FIG. 2 is a depiction of various waveforms occurring at selected locations of the system shown in FIG. 1 useful in understanding the operation thereof.
Figure 3:
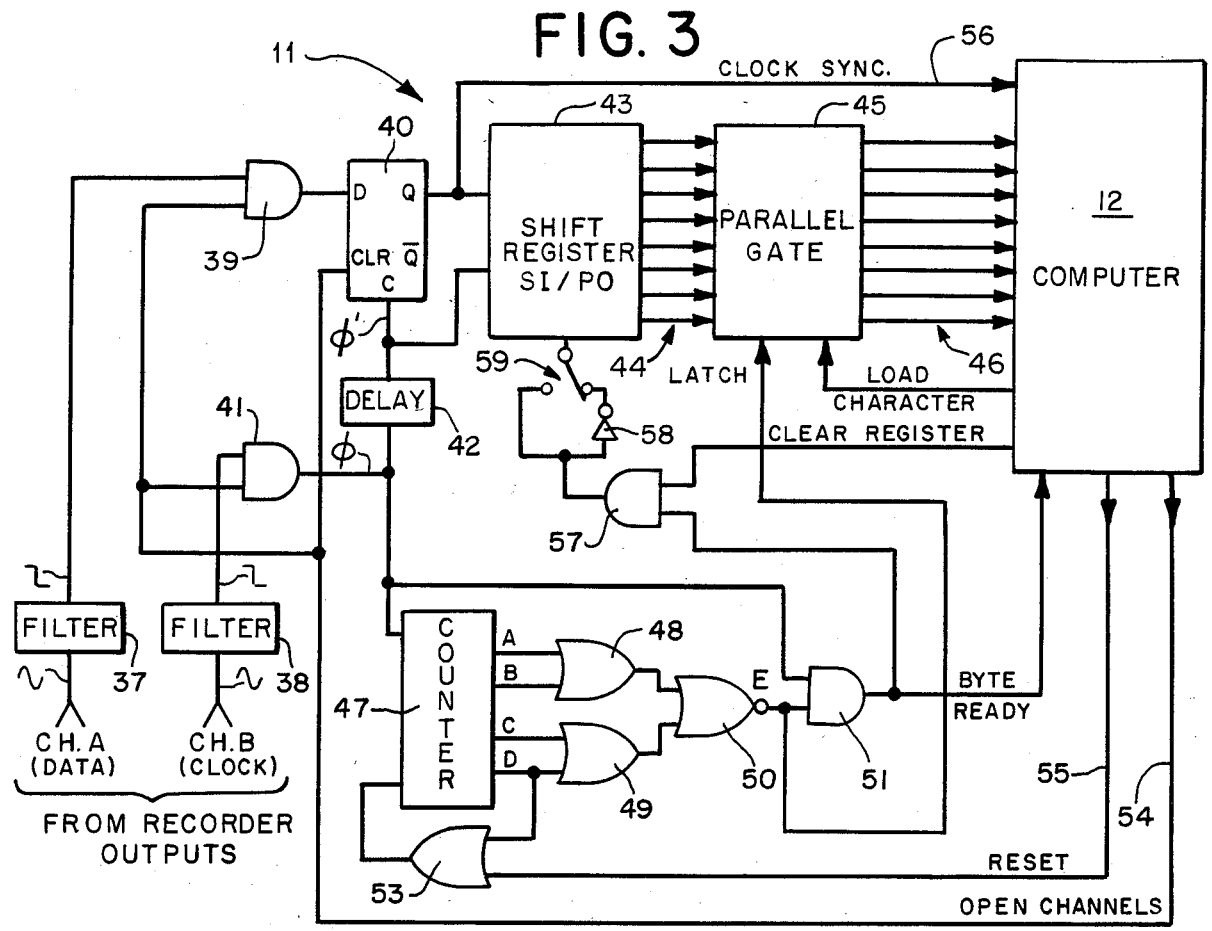
FIG. 3 is a simplified electrical schematic diagram of a system, constructed in accordance with the present invention, for recovering digitally encoded data recorded by the system of FIG. 1.

Referring to the drawings and in particular to FIGS. 1-4, a high density data recording system, constructed in accordance with the present invention, is illustrated. The system includes a data encoding/recording system 10, an example of which is shown in FIG. 1, and a data playback/decoding system 11, an example of which is shown in FIG. 3. The encoding system 10 accepts digital data from a source, such as a computer 12, and processes the data for recording on a suitable magnetic medium Typically, a magnetic recording device, such as a conventional hi-fidelity audio recording deck (not shown), is employed to record the processed data. Data, which are so recorded, may then be retrieved and processed by the playback/decoding system 11 for use by the computer 12.

Operation of the encoding/recording system 10 may best be understood by reference to FIGS. 1 and 2. In accordance with conventional practice, data from the computer 12 are provided in parallel form on an eight bit data bus 13. It will be appreciated that while an eight bit data bus is shown, the invention may be adapted to other data formats. Generally, the system 10 processes the data supplied by computer 12 and provides two signals, DATA and CLOCK at output channels A and B for application to respective inputs of the two channel recording device.

In the example illustrated, each data word provided by the computer comprises eight bi-stable logic bits. In accordance with conventional practice, each bit is set to either logic-1 or logic-0 to represent data according to one of the many data coding formats well-known in the art. To permit the data to be recorded on a two channel recorder, the system, in known manner, converts the parallel data word provided by the computer to a corresponding word in serial format.

The fundamental operation of the high density data recording system may be understood by reference to the channel A and channel B output waveforms of FIG. 2. As illustrated the channel B output comprises a periodic bi-polar signal of substantially constant frequency. Each complete cycle of the channel B signal defines a period of substantially constant duration resulting in the sequential production of a plurality of such periods labelled 1–8 in the figure. Each of these periods is associated with a particular bit of the serial data word to be recorded.

The channel A data signal actually conveys the encoded data to the recording device employed and may be thought of as being divided into a plurality of periods corresponding to the periods defined by the channel B clock signal. Each period of the channel A data signal corresponds in time with a respective one of the channel B clock periods and represents the logic state of each respective bit of the data word to be recorded. For example, when the 8-bit data word "01011001" is to be recorded, the channel A data signal is divided into eight sequential periods corresponding to eight complete cycles of the channel B clock signal. Within each of the eight periods so defined, the channel A data signal indicates whether the respective data bit of the serial data word is logic-0 or logic-1. In the example shown, this is accomplished by fully attenuating the channel A output during those periods wherein the corresponding data bit is logic-0 and providing a single bi-polar cycle, corresponding to an unattenuated single cycle of the channel B clock signal, during those periods wherein the corresponding data bit is logic-1.

Figure 4:
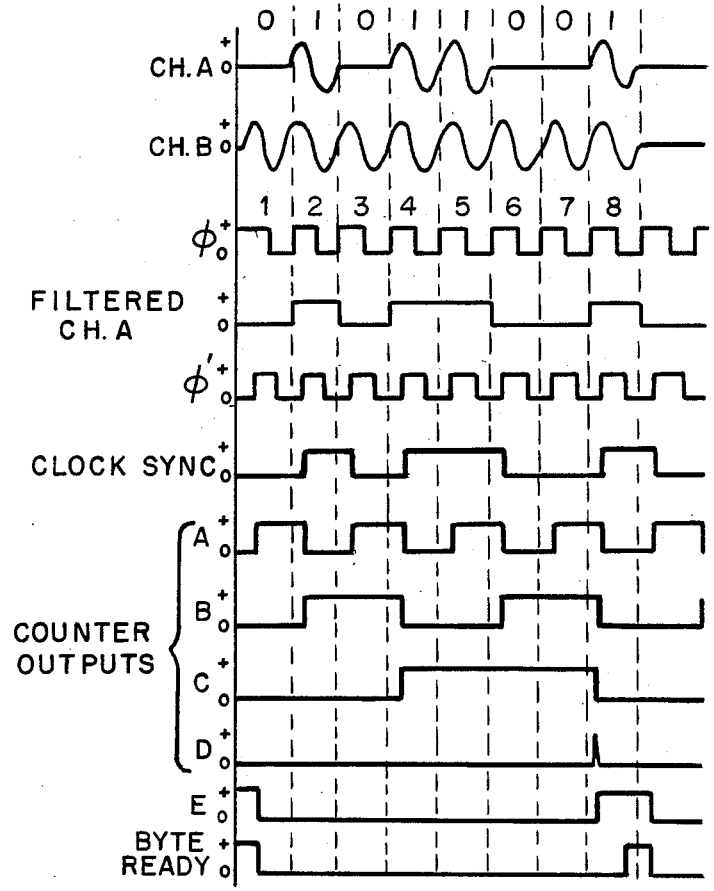
FIG. 4 is a depiction of various waveforms occurring at selected locations of the system illustrated in FIG. 3, useful in understanding the operation thereof.

Operation of the system during retrieval of the recorded data may be understood by reference to the channel A data and channel B clock waveforms of FIG. 4. As illustrated, the channel B clock signal defines a plurality of substantially constant duration periods 1–8, which, in turn, define corresponding periods of the channel A data signal. The status of the channel A signal during each of these periods is determined by means of appropriate circuitry to reconstruct the originally recorded data word.

The system as described permits high density recording of the digitally encoded data on the recording medium. This is accomplished by operating the channel B clock signal near the upper frequency limit of the recording device. While it would be possible, and at times desirable, to define each channel A period by two or more cycles of the channel B clock signal, maximum recorded data density is achieved by defining each channel A period as one complete cycle of the channel B clock signal.

To further increase recorded data density, both the channel A data and channel B clock signals are controlled as to avoid saturation of the recording medium. One way of accomplishing this is to employ clock and data signals having the characteristics of a sine wave, as shown, and maintain their levels sufficiently low as to avoid tape saturation. It will be appreciated, however, that the channel A data and channel B clock signals may each have waveforms other than the sine waves shown without departing from the scope of the invention.

An illustrative embodiment of an encoding/recording system 10 for implementing the high density data recording technique is illustrated in FIG. 1. To generate the channel B clock signal, system 10 includes an oscillator 14, which provides a series of evenly spaced logic pulses $2\phi$ in response to application of a CLOCK ENABLE signal supplied by computer 10 through a control line 15. The oscillator output, $2\phi$, is applied to the clock input of a D-flip-flop 16, the $\overline{Q}$ output of which is applied to the D input. Flip-flop 16, when connected in this manner, serves as a divide by two divider resulting in the production of a uniform series of clock pulses $\phi$ at its Q output at a frequency one-half that of the oscillator output $2\phi$. Flip-flop 16 also serves as a gate for controlling generation of the clock signal in accordance with a control signal applied to the C1 input. When generated in this manner, the clock signal $\phi$ comprises a series of alternating logic-1 and logic-0 pulses of equal and uniform duration as shown by the waveform of FIG. 2.

To obtain maximum data recording density, the channel B clock signal preferably operates near the upper frequency limit of the recording deck. Accordingly, the frequency of oscillator 14 is preferably adjustable, either through user manipulation of an external control, or in response to control signals generated by computer 10 in accordance with appropriate programming. The use of a separate oscillator in the encoding/recording system 10 permits the system to be used with a number of different computers and to be operated near the upper frequency limit of the recording device regardless of the clock frequency of the particular computer employed.

The Q output of flip-flop 16 is connected to the input of a bi-polar converter 17 of known construction which converts the unipolar pulses of clock signal $\phi$ to bi-polar pulses available at its output. These bi-polar pulses are applied to the input of a suitable filter 18, of known construction, which provides the sinusoidal channel B clock signal at its output by attenuating the higher order components of the rectangular bi-polar input signal.

To produce the channel A data signal, digitally encoded data, in parallel form, are first applied through data bus 13 to the input of a Parallel-In/Serial-Out shift register 19. The Q output of flip-flop 16 is connected to the clock input of shift register 19, which in known manner provides serial output data corresponding to the parallel data input. A Single-Pole/Double-Throw switch 20, in conjunction with an invertor 20a, is connected to the clock input of shift register 19, to allow the circuit to be adapted to provide an output from the shift register upon negative to positive transitions of the clock signal $\phi$ regardless of the switching characteristics of the particular shift register selected. The serial data, corresponding to the parallel data applied through data bus 13, appear at the output 21 of shift register 19.

Referring further to FIG. 1, the output of bi-polar converter 17 is coupled through serially connected resistors 22 and 23 to the input of a second shaping filter 24 of known construction. The output of filter 24 provides the channel A data signal. Like filter 18, filter 24 provides a substantially sinusoidal signal in response to the rectangular unipolar input pulses applied through resistors 22 and 23. Preferably, the transfer characteristics of filters 24 and 18 are selected so that the channel A output signal of filter 24 will correspond to the channel B output of filter 18 both in frequency and phase.

Since the clock signal $\phi$ applied to the input of bi-polar converter 17 is also applied to the clock input of shift register 19, the shift register will generate one serial bit at its output during each cycle of the channel B clock signal. These bits, provided at the output 21 of shift register 19, comprise a serial data word corresponding to the parallel data word generated by computer 12. This serial data word is then carried by the channel A data signal for recording on the magnetic medium. The serial data word is carried on the channel A data signal by selectively attenuating each cycle of the signal in accordance with the logic state of each corresponding data bit provided by shift register 19.

To selectively attenuate the channel A data signal in accordance with the serial data word, the system includes signal attenuation means in the form of an analog gate 25 connected between the juncture of resistors 22 and 23 and circuit ground. The control electrode of analog gate 25 is connected to the output 21 of shift register 19 through a resistor 26.

In the example shown, a logic-0 signal applied to the control electrode of analog gate 25 biases the gate "on" thereby effectively grounding the input of filter 24, with the result that the channel A data output signal is fully attenuated and thus maintained constant at circuit reference potential. A logic-1 signal applied to the control electrode biases analog gate 25 "off" thereby allowing the unattenuated bi-polar converter output signal to pass to the input of filter 24, with the result that the channel A data output signal corresponds to the channel B clock output signal over the period in which the control electrode remains at logic-1.

Since the control electrode of the analog gate is coupled to the output of the shift register 19, the channel A data output will be unattenuated when the serial data output bits are logic-1, and will be fully attenuated when the serial data output bits are logic-1. Accordingly, the channel A data signal will have the waveform illustrated in FIG. 2.

To facilitate rapid and accurate conversion of parallel data to serial format, appropriate control circuitry is provided. Parallel data generated by computer 12 and applied to data bus 13 are loaded into shift register 19 when an appropriate control signal generated within the computer at the end of each serial data word or byte is applied to the shift register through character load/send control line 27. The parallel data so loaded will remain within the shift register for a period of clock cycles equal in number to the number of bits comprising the data word or byte. In the case of an eight bit data word, eight clock pulse cycles must occur before further data are loaded into the register 19.

To signal the end of each data byte the system 10 includes circuitry for generating an END OF BYTE pulse for application to the computer upon every eighth cycle of the clock signal $\phi$. This circuitry includes a binary counter 28 having its clock input connected to the Q output of flip-flop 16. The counter provides outputs A-D having the waveforms illustrated in FIG. 2 in response to state transitions of the input clock signal $\phi$. The A and B outputs of counter 28 are connected to the inputs of a first OR-gate 29 while outputs C and D are connected to the inputs of a second OR-gate 30. The outputs of these gates are connected to the inputs of a NOR-gate 31, the output of which it is connected to one input of an AND-gate 32. The signal E produced at the output of gate 31 has the waveform shown in FIG. 2. The remaining input of AND-gate 32 is connected to the Q output of flip flop 16. The D output of counter 28 is applied through an OR gate 33 to the RESET terminal of the counter.

The counter 28 together with gates 29–33 produces an END OF BYTE signal at the output of AND-gate 32, which is then applied to the computer 12 through control line 34. The END OF BYTE signal has the waveform illustrated in FIG. 2 and comprises a positive going logic pulse of ½ cycle duration generated at the completion of every eighth cycle of clock signal $\phi$. It will be appreciated that when date formats other than the 8 byte format described herein are utilized, appropriate circuitry will be provided to generate an END OF BYTE signal upon the completion of a series of clock signal cycles equal in number to the number of bytes in each word of the data format selected.

Upon receipt of the END OF BYTE signal, the computer 12, in response to appropriate programming, supplies the next data word to shift register 19 through data bus 13. At the same time, the computer generates a character LOAD/SEND signal which when applied to shift register 19 through control line 327 signals the shift register to load the next data word. The computer may also be programed to generate RUN and STOP control signals which, in conjunction with a bi-stable latch comprising NAND-gates 35 and 36, enables or disables the system as desired.

FIG. 3 shows the illustrative playback/decoding system 11 for recovering data recorded through encoding/recording system 10. The recovered channel A data and channel B clock signals from the outputs of the recording deck are applied to the inputs of shaping filters 37 and 38 respectively, which, in known manner, provide unipolar rectangular output logic pulses in response thereto.

The filtered channel A output of filter 37, which corresponds to the data recorded on channel A and has the waveform shown in FIG. 4, is applied through an AND-gate 39 to the D input of a flip-flop 40. The output of filter 38 corresponding to the channel B clock signal, is applied through an AND-gate 41 and delay line 42 to the clock input of the flip flop. Delay line 42 delays the recovered clock signal by approximately one quarter clock cycle to generate delayed clock signal $\phi'$ having the wave form illustrated in FIG. 4, which is applied to the flip flop. When so operated, flip-flop 40 will provide at its Q output, a signal corresponding to the signal produced at the output of shift register 19 (FIG. 1) at the time of recording.

Output Q of flip-flop 40 is connected to the data input of a Serial-In/Parallel-Out shift register 43. The delayed clock signal, $\phi'$, is applied to the clock input of shift register 43. Parallel data from shift register 43 is applied through a data bus 44 to the input of an 8 channel parallel gate 45. The output of parallel gate 45 is connected through a data bus 46 to the data input of computer 12.

To control operation of the playback/decoding circuitry, the system 11 includes circuitry for indicating the end of each data word or byte. This circuitry, which may be identical to the corresponding circuitry of the encoding/recording system 10 and which in practical system may comprise the same circuit components during both data encoding and decoding, includes a binary counter 47, OR-gates 48 and 49, NOR-gate 50 and AND-gate 51. Counter outputs A and B are connected to the inputs of OR-gate 48 while outputs C and D are connected to the inputs of OR gate 49. The outputs of gates 48 and 49 are each connected to an input of NOR-gate 50, the output of which is connected to an input of AND-gate 51. The recovered channel B clock signal, $\phi$, is applied to the remaining input of AND gate 50. The D output of counter 47 is applied through another OR-gate 53 to the reset terminal of the counter.

Counter 47 together with gates 48-53 generates a BYTE READY pulse having the wave form illustrated in FIG. 4 upon the occurrence of every eighth cycle of clock signal $\phi$. The BYTE READY pulse appearing at the output of AND-gate 51 is applied to the latch input of parallel gate 45 and to an appropriate control input of computer 12. The computer, in known manner, is programed to respond to the occurrence of the BYTE READY pulse and generates a LOAD CHARACTER pulse which is applied to a control input of the parallel gate. Upon application of the LOAD CHARACTER control signal, the parallel gate transfers the accumulated data word through data bus 46 to the data input of computer 12.

The playback/decoding system 11 is adapted for operational control by computer 12. To this end, the remaining input terminals of AND-gates 39 and 41 are connected through a control line 54 to an OPEN CHANNELS signal output port of the computer. A logic-1 signal on control line 54 allows the signals from filters 37 and 38 to pass through AND-gates 39 and 41, respectively. The OPEN CHANNELS signal is also applied to the latch input of gate 45 to enable that device. The remaining input of OR-gate 53 is connected through control line 55 to a RESET signal output port of the computer. Gates 39 and 41 individually control application of the recovered channel A data and channel B clock signals to flip-flop 40 and delay line 42 respectively, and hence a logic-1 signal applied through control line 54 enables the decoding circuitry of the system. Similarly, a logic-0 signal disables the system. A logic-1 signal applied to control line 55 resets counter 47 thereby initiating a new count sequence. Shift register 43 can be cleared through application of a CLEAR REGISTER signal from the computer through AND gate 57, inverter 58 and switch 59. The switch 59 adapts the circuit for use with a variety of shift registers.

Accurate recovery of pre-recorded data requires proper synchronization of the incoming channel B clock pulses with the BYTE READY signal provided by counter 47 and gates 48-53. To this end, the Q output of flip-flop 40 is connected through clock synchronization line 56 to an input port of computer 12. Synchronization is provided through appropriate programming of the computer 12 and is accomplished recording the data word "11111111", at the beginning of each block of recorded data. During playback, the recovered data will be preceeded by an eight bit long logic-1 pulse. The computer is programmed to recognize this long pulse and immediately resets the circuit upon its termination. This assures proper synchronization during recovery of the data which follow.

Figure 5:
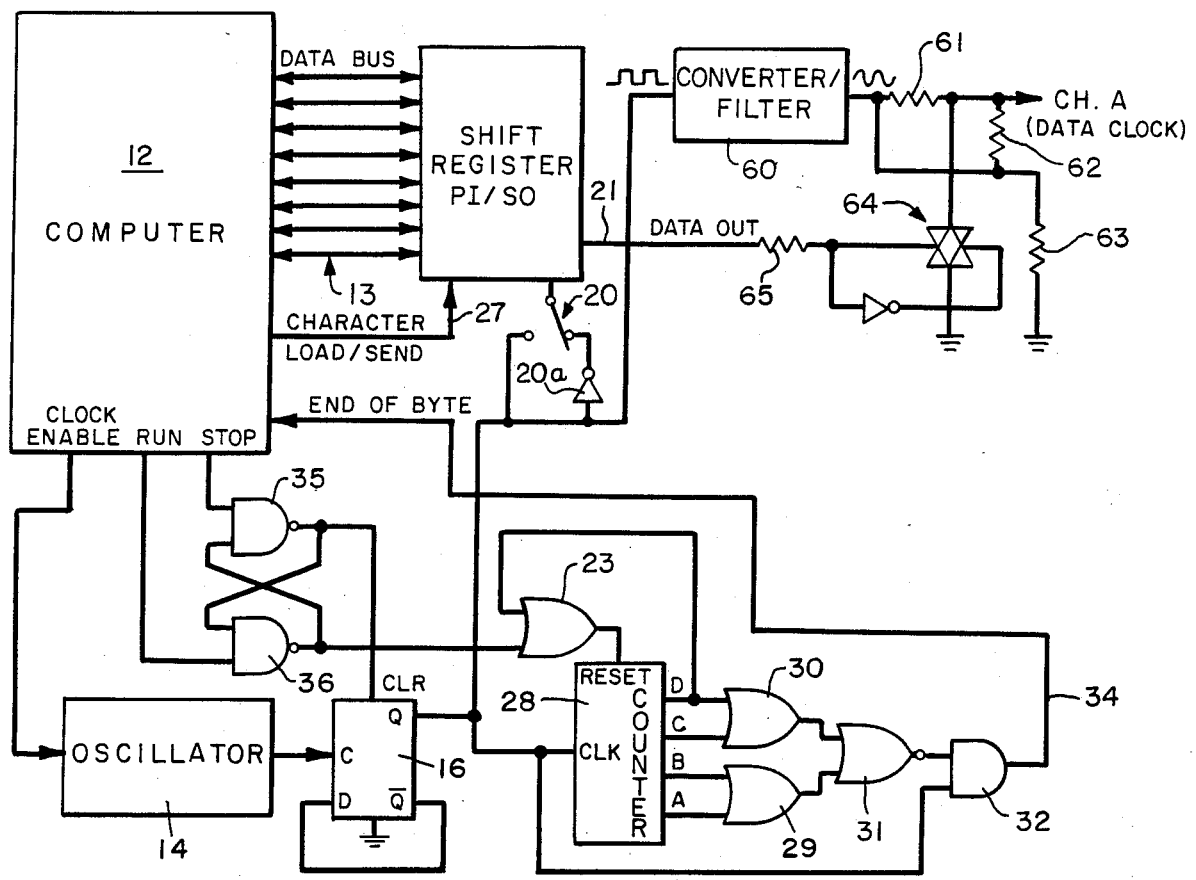
FIG. 5 is a simplified schematic diagram, similar to FIG. 1, of a system for recording digitally encoded data wherein clock and data signals are recorded on a single channel.

FIG. 5 illustrates the encoding/recording system 10 of FIG. 1 modified as to provide single channel recording. The components which remain unchanged are designated by the same reference numerals as used in FIG. 1. These components operate as previously described relative to FIG. 1 and accordingly the discussion which follows is directed to the modifications which permit single channel recording.

Referring to FIG. 5, the clock signal $\phi$ produced at the Q output of flip-flop 16 is applied to the input of a bipolar converter/filter 60 which in known manner converts the unipolar rectangular clock pulses to a bipolar sinusoidal signal which appears at its output. The sinusoidal signal so produced corresponds in frequency to the clock signal $\phi$. The output of converter 60 is coupled through a resistor 61 to a channel A combined DATA/CLOCK output terminal. The channel A data/clock output terminal is also coupled through a pair of serially connected resistors 62 and 63 to circuit ground.

To partially attenuate the data/clock output signal in accordance with the data to be recorded, an analog switch 64 is connected between the juncture of resistors 62 and 63 and circuit ground. The control electrode of analog switch 64 is connected through a resistor 65 to the data output terminal 21 of shift register 19. Resistors 61, 62 and 63 together form a voltage divider which determines the level of the signal appearing at the channel A data and clock output terminal. When on, analog switch 64 provides a low impedance circuit path to ground thereby effectively removing resistor 63 from the voltage divider circuit. This results in partial attenuation of the signal level appearing at the channel A data and clock output. The degree of attenuation thus provided is determined by the relative values of resistors 61-63.

Figure 6:
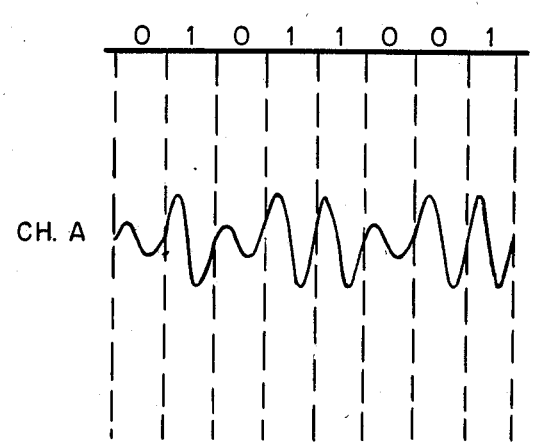
FIG. 6 is a depiction of the combined clock-data signal provided by the system of FIG. 5.

Since the analog switch 64 is controlled by the data output of shift register 19, the channel A DATA/CLOCK output signal will be intermittently attentuated in accordance with the data output. FIG. 6 is a graphical depiction of such attenuation when the data word "01011001" is to be recorded. In the embodiment illustrated, analog switch 64 is biased ON through application of a logic-0 signal to its control electrode, while application of a logic-1 signal biases the switch OFF. This results in partial attenuation of the channel A signal during logic-0 bits of the serial data word and no attenuation of the signal when a bit is logic-1. Accordingly, FIG. 6 shows a generally sinusoidal signal at the frequency of the clock signal $\phi$ in which each cycle corresponds to an individual byte of a serial data word, and in which the amplitude of the signal during each cycle is determined by the respective logic state of each bit of the data word to be recorded. In practice, the levels of the attenuated and unattenuated signals thus generated will be limited so as to avoid saturation of the recording medium and the relative attenuation will be sufficient as to readily distinguish the logic-0 and logic-1 data bits.

Figure 7:
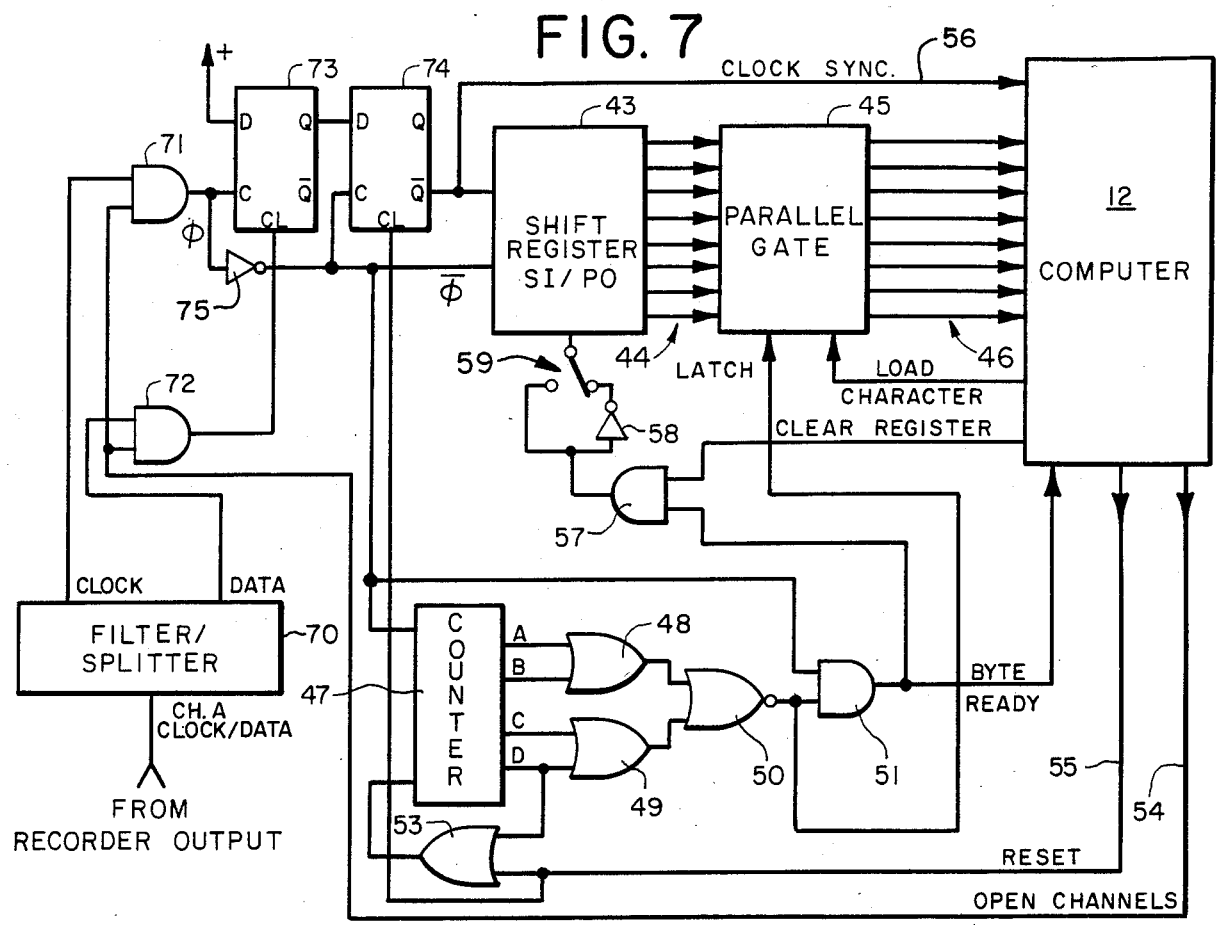
FIG. 7 is a simplified schematic diagram, similar to FIG. 3, for recoverying the data recorded by the system of FIG. 5.

FIG. 7 illustrates the decoding circuitry of FIG. 3 as modified to decode the single channel combined data and clock signal generated by the circuit of FIG. 5. This figure corresponds generally to that of the decoding circuit of FIG. 3 and again the unchanged components are designated with the same reference numerals as used in FIG. 3. Referring to FIG. 7, the single channel data recovery system includes a filter/splitter circuit 70 of known construction the input of which is connected to the recording device output. Filter 70 responds to the signal level of the clock/data input signal and produces a clock signal at one output and a data signal at the other output corresponding to the instantaneous level of the input clock/data signal.

The clock signal is applied to one input of an AND-gate 71 while the data signal is applied to an input a second AND-gate 72. The remaining inputs of gates 71 and 72 are connected to the OPEN CHANNELS control line 54.

To avoid ambiguities resulting from slight missynchronization between the recovered clock and data signals, the clock output of gate 71 is applied to the C input of a first flip-flop 73 and through an inverter 75 to the C input of a second flip-flop 74. The data output of gate 72 is applied to the C1 input of flip-flop 73. The D input of flip-flop 73 is connected to the positive supply voltage while the D input of flip-flop 74 is connected to the Q output of flip-flop 73.

Figure 8:
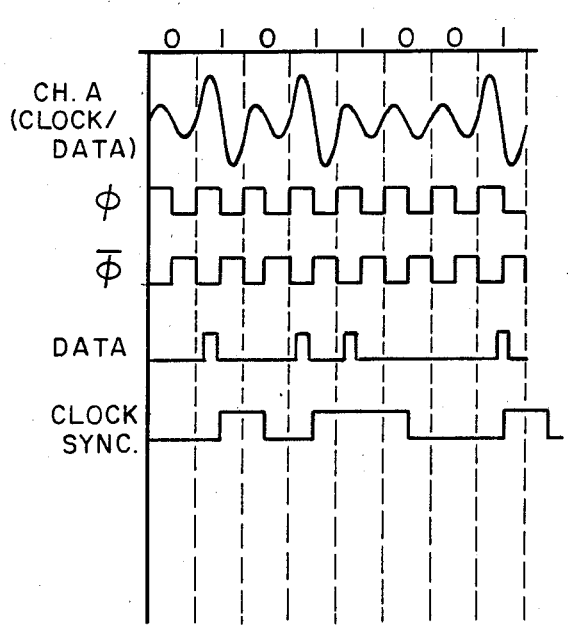
FIG. 8 is a depiction of various waveforms occurring at selected locations in FIG. 7 useful in understanding the operation thereof.

Flip-flop 73 is set by the clock input and reset when the data from Gate 72 is LOGIC-1. The signal appearing at its Q output is applied to the D input of flip-flop 74. Flip-flop 74 provides at its $\overline{Q}$ output a replica signal of the originally recorded data having the waveform designated CLOCK SYNC shown in FIG. 8 which corresponds to the recovered data signal. This signal appearing at the $\overline{Q}$ output of flip-flop 74 is applied to the input of shift register 43 where it is processed in the manner previously developed relative to FIG. 3.

While an illustrative system has been described herein, it will be apparent that many modifications may be made to the system without departing from the scope of the invention in its broader aspects. For example, in creating the channel A data and channel B clock signals, the attenuation of the data signal need not take place following bipolar conversion and before filtering, but rather may be accomplished either before bipolar conversion or after filtering. Similarly, the data and clock signals need not have the sinusoidal waveforms described but may comprise any other periodic waveform. Finally, logic circuitry having a configuration other than that illustrated may be used to generate the various control signals without departing from the scope of the invention.

While the foregoing specifications sets forth various embodiments of the present invention and detail, it will be appreciated that modifications thereto may be made without departing from the spirit and scope thereof. Accordingly, only such limitations are to be imposed on this invention as are indicated in the appended claims.

I claim:

1. A system for processing digitally encoded data for storage on a magnetic recording medium, comprising:
    clock signal means for generating a periodic clock signal of substantially constant frequency;
    data signal means operable from said clock signal for generating a periodic data signal of substantially constant frequency;
    data conversion means responsive to said clock signal for converting the parallel digitally encoded data to a corresponding plurality of sequentially occurring bi-stable logic bits; and
    signal attenuation means responsive to said plurality of sequentially occurring logic bits for attenuating said data signal in accordance with the logic state of each of said bits, whereby, the logic state of each of said bits is indicated by the relative level of said data signal.

2. A system as defined in claim 1 wherein said data and said clock signals are of the same frequency.

3. A system as defined in claim 2 wherein said data conversion means provide a single bit during each cycle of said clock signal.

4. A system as defined in claim 3 wherein said data and said clock signals each comprise substantially sinusoidal periodic signals.

5. A system as defined in claim 4 wherein the level of said clock and data signals is limited as to avoid saturating the magnetic recording medium.

6. A system as defined in claim 5 wherein said clock and said data signals are recorded on separate channels of the magnetic recording medium.

7. A system as defined in claim 5 wherein said clock and said data signals are recorded on the same channel on the magnetic recording medium.

8. A system as defined in claim 6 wherein said signal attenuation means fully attenuate said data signal in accordance with the logic state of said bits of the digitally encoded data.

9. A system as defined in claim 7 wherein said signal attenuation means partially attenuate said data signal in accordance with the logic state of said bits of the digitally encoded data.

10. A system as defined in claim 8 wherein the digitally encoded data are applied to said system in the form of parallel data bytes, each of the bytes comprising a fixed number of bits.

11. A system as defined in claim 9 wherein the digitally encoded data are applied to said system in the form of parallel data bytes, each of the bytes comprising a fixed number of bits.

12. A system as defined in claim 10 wherein said data conversion means comprise a Parallel-In/Serial-Out shift register operable from said clock signal.

13. A system as defined in claim 11 wherein said data conversion means comprise a Parallel-In/Serial-Out shift register operable from said clock signal.

14. A method for processing parallel digitally encoded data comprising the steps of:
    generating a periodic clock signal of substantially constant frequency;
    generating a periodic data signal of substantially constant frequency;
    converting the parallel digitally encoded data to a plurality of sequentially occurring bi-stable logic data bits, each of said bits being produced upon the occurrence of a fixed number of cycles of said clock signal; and
    attenuating selected cycles of said data signal in accordance with the logic state of individual ones of said plurality of logic bites, whereby the level of individual cycles of said data signal indicate the logic state of respective ones of said plurality of logic bits.

15. A method as defined in claim 14 wherein said clock signal and said data signal operate at the same frequency.

16. A method as defined in claim 15 each said logic data bit is provided in response to one cycle of said clock signal.

17. A method as defined in claim 16 wherein said clock and data signals each comprise periodic substantially sinusoidal signals of constant frequency.

18. A method as defined in claim 17 wherein said data signal is partially attenuated in response to said logic data bits being of one state and unattenuated in response to said logic data bits being of opposite logic state.

19. A method as defined in claim 17 wherein said data signal is fully attenuated in response to said logic data bits being of one state and unattenuated in response to said logic data bits being of opposite logic state.

* * * * *